United States Patent Office 3,211,782
Patented Oct. 12, 1965

3,211,782
P-VINYL BENZENE PHOSPHONOUS ACID
Robert Rabinowitz, Stamford, Conn., assignor to American Cyanamid Company, New York, N.Y., a corporation of Maine
No Drawing. Filed Aug. 21, 1961, Ser. No. 132,599
1 Claim. (Cl. 260—500)

This invention relates to a novel phosphonous acid and to a method for its preparation. More particularly, it relates to vinylbenzenephosphonous acid capable of being readily copolymerized with a variety of monomers.

It is known that p-vinylbenzenephosphonic acid, insoluble in hydrocarbon solvents, can be prepared. However, the corresponding phosphonous acid, substantially soluble in hydrocarbon solvents, cannot be prepared from higher vinylbenzenephosphonic acid by reduction. When such technique is employed, the vinyl substituent is readily affected. Hydrocarbon solvent-soluble vinylbenzenephosphonous acid, if it can be prepared, permits its use in solvent media hitherto unavailable.

It is, therefore, a principal object of the present invention to prepare vinylbenzenephosphonous acid in good yield and purity. It is a further object to prepare vinylbenzenephosphonous acid soluble in hydrocarbon solvents. It is a still further object to provide a process for the preparation of vinylbenzenephosphonous acid in a direct manner. Other objects and advantages can be readily ascertained from a reading of the following description.

According to the present invention, vinylbenzenephosphonous acid can be prepared in a straightforward manner by reacting substantially equimolar proportions of vinylbenzenemagnesium chloride and bis(dimethylamino) chlorophosphine at initial temperatures below 0° C., and preferably between about —50° C. and —60° C., until all the reactants have been admixed, at which time the temperature is permitted to be raised to room temperature (22° C.–25° C.). The reaction is conducted in a solvent menstruum, such as tetrahydrofuran. Upon hydrolysis, vinylbenzenephosphonous acid is recovered in good yield and purity.

Advantageously, the vinylbenzenephosphonous acid can be readily copolymerized with a variety of monomers, such as styrene, acrylonitrile, ethyl acrylate, vinyl acetate and mixtures thereof. These polymers demonstrate improved basic dye receptivity and flame resistance. Surprisingly, these polymers can be prepared in bulk or in hydrocarbon solvents. The corresponding vinylbenzene phosphonic acid is known to be substantially insoluble in many of the above-mentioned monomers as well as in hydrocarbon solvents.

To further illustrate the process of the invention, the product acid so-produced as well as the copolymers prepared therefrom, the following examples are presented. Unless otherwise stated, the parts are by weight.

Example 1

In a suitable apparatus, equipped with condenser, stirrer and thermometer, p-vinylbenzenemagnesium chloride is prepared by admixing 9.7 parts of magnesium, 4.2 parts of ethyl bromide, 27.6 parts of p-chlorostyrene and 80 parts of tetrahydrofuran. Reaction temperature is maintained at between 50° C.–55° C. Reaction mixture is next diluted with 72.5 parts of tetrahydrofuran and added to a solution of 30.0 parts of bis(dimethylamino) chlorophosphine in 218 parts of tetrahydrofuran. The reaction mixture is maintained at —50° C. to —60° C. during the addition and when completed is allowed to warm to room temperature. The solution is poured into a 500 parts of ice water mixture containing 75 parts of 12 N HCl and the resultant mixture extracted seven times with a total of 700 parts (by volume) of chloroform. The latter is dried over magnesium sulfate, filtered and reduced in volume to 125 parts at which point some solid is noted. This is collected in 1.7 parts yield having a melting point equal to about 120° C.–130° C. When the filtrate is reduced in volume to 50 parts, additional solid is noted. The mixture is diluted with 50 parts by volume of chloroform and the insolubles removed. This filtrate is poured into 800 parts (by volume) of hexane. Solids (13.4 parts) are removed and the filtrate is then reduced to 400 parts (by volume) and cooled at —15° C. Crystalline material (3.6 parts) is obtained. After recrystallization, p-vinylbenzenephosphonous acid, having a melting point of 74° C.–75.5° C., is recovered. Upon analysis, the following is noted:

Calculated for $C_8H_9O_3P$: (in percent (%)) C, 57.0; H, 5.36; P, 18.4. Found: C, 56.88; H, 5.77; P, 18.20.

Substituting o-chlorostyrene for p-chlorostyrene in the above example, the corresponding o-vinylbenzenephosphonous acid is obtained in good yield and purity.

Example 2

This example illustrates the copolymerization of p-vinylbenzenephosphonous acid with styrene.

A mixture of 0.062 part of p-vinylbenzenephosphonous acid as prepared in Example 1, 0.008 part of azoisobutyronitrile and 1.82 parts of styrene is heated after degassing and sealing in an ampoule for 17 hours at 60° C. Resultant product is a hard glass-like polymer which dissolves in $CHCl_3$. The latter solution is precipitated into hexane, collected, redissolved in $CHCl_3$ and reprecipitated. A yield of 1.4 parts is obtained. Resultant product is also soluble in toluene and benzene. The polymer has an intrinsic viscosity of 1.32 in $CHCl_3$ at 30° C. as compared to 0.89 for a sample of polystyrene.

Example 3

In this example, a p-vinylbenzenephosphonous acid copolymer is treated with a basic dyestuff to demonstrate the receptivity of the dyestuff on the polymer.

Into a three-necked flask equipped with thermometer, stirrer and nitrogen inlet are added 10.0 parts of vinyl acetate, 90 parts of acrylonitrile, 0.5 part of p-vinylbenzenephosphonous acid, 865 parts of water and 35 parts of 2.6 N hydrochloric acid. Resultant solution is mixed and maintained under nitrogen at 40° C. During the first three and one-half hours, a solution of 0.852 part of sodium chlorate and 3.02 parts of sodium sulfite in 150 parts of water is added. Resultant polymer is filtered one hour later and is dried.

The latter polymer is readily saturation dyed with Sevron Brilliant Red 4G (C.I. Basic Red No. 14) dye solution at the boil for one hour at a pH of 5.5 to a brilliant red.

I claim:
The compound: p-vinylbenzenephosphonous acid.

References Cited by the Examiner

UNITED STATES PATENTS

| | | | |
|---|---|---|---|
| 2,911,378 | 11/59 | Bregman | 260—80 |
| 2,934,564 | 4/60 | Burg et al. | 260—543 |
| 3,051,740 | 8/62 | Abramo et al. | 260—500 X |

(Other references on following page)

OTHER REFERENCES

Kabachnik et al.: "Chem. Abs.," vol. 54, col. 20845 (1960).

Kosolapoff: J. Am. Chem. Soc., vol. 72, 1950, pp. 5508–5509.

Morrison: J. Am. Chem. Soc., vol. 73, 1951, pp. 5896, 5897.

Van de Westeringh et al.: "Rec. des Trav. Chim. des Pays-Bas," vol. 77, pp. 1096–1106 (1958).

Wiley et al.: J. Polymer Sci., vol. 42, 1960, pp. 113–116.

LEON ZITVER, *Primary Examiner.*